United States Patent [19]

Hess, Jr.

[11] 4,207,513
[45] Jun. 10, 1980

[54] AUTOMATIC BATTERY CHARGER

[75] Inventor: John S. Hess, Jr., Pittsburgh, Pa.

[73] Assignee: Power Control Corporation, Pittsburgh, Pa.

[21] Appl. No.: 876,600

[22] Filed: Feb. 10, 1978

[51] Int. Cl.² ............................................. H02J 7/04
[52] U.S. Cl. ...................................... 320/23; 320/31; 320/32; 320/37
[58] Field of Search .................... 320/22–24, 320/32,39, 21, 37, 38

[56] References Cited

U.S. PATENT DOCUMENTS

| | | | |
|---|---|---|---|
| 3,217,225 | 11/1965 | Gottlieb et al. | 320/31 UX |
| 3,758,839 | 9/1973 | Medlar | 320/32 |
| 3,864,617 | 2/1975 | Smith et al. | 320/23 |

Primary Examiner—Robert J. Hickey
Attorney, Agent, or Firm—Thomas H. Murray

[57] ABSTRACT

A battery charger is provided for industrial storage batteries which includes both digital and analog control circuits for controlling the charging voltage to maintain a charging cycle in which the current is initially held to a maximum value until the cell voltage rises to a preset level, after which the cell voltage is maintained constant at this level until a preset minimum current is reached, and the minimum current is then maintained for a fixed period of time. The charger requires no adjustments for ampere-hour rating or for number of cells in the battery, and is capable of charging batteries of any ampere-hour rating over a wide range, without any adjustment.

3 Claims, 2 Drawing Figures

AUTOMATIC BATTERY CHARGER

BACKGROUND OF THE INVENTION

The present invention relates to battery chargers for recharging storage batteries, and especially to a charger for industrial batteries of relatively high capacity such as are used, for example, in mine cars and industrial trucks.

Such batteries may have different capacities depending on their intended use, and are, therefore, available in a relatively large number of standard ampere-hour ratings extending over a considerable range and which may be as high as 800 ampere-hours or more, for example. Such batteries, even when fully discharged, must be completely charged within a time period of not over eight hours, so that the battery can be put on charge at the end of a working shift and will be ready for use again at the end of the next shift. This requires a charger, preferably automatically controlled, that can maintain the charging rates on a preset cycle such that the battery will be fully charged within the required time but not overcharged.

As indicated above, these batteries may be rated at any ampere-hour capacity extending over a wide range. In addition, the number of cells in the battery may vary depending on the desired battery output voltage. It has been considered necessary, therefore, to design battery chargers for this type of service so that they could be adjusted for the different possible ampere-hour ratings and for different numbers of cells. That is, adjustments have been provided so that the maximum and minimum charging currents could be set to different values for batteries of different ratings such that the currents had fixed relations to the rating, the current usually being a predetermined percentage of the ampere-hour rating. Batteries are also usually available with at least two different numbers of cells, depending on the desired voltage, and adjustments have also been provided to adjust for the number of cells so that a desired constant voltage per cell could be maintained.

These adjustments were, of course, provided to enable a given battery charger to be used to charge different batteries of different ratings and number of cells. In practice, these adjustments were usually made at the factory by the manufacturer of the charger since battery chargers are usually purchased for use with a specific size of battery. In some cases, however, the adjustment may be made by the user if a change is made to batteries of a different rating. The provision of adjustments of this kind in an otherwise standard battery charger has represented an undesirable complication and an added cost. The presence of these adjustments also involves the risk that the user might attempt to make adjustments when they are not needed, as the charger would normally have been correctly set initially. If a change of adjustment should be required, it might be made incorrectly, or the user could fail to make an adjustment when it should have been made. Either of these possibilities could have serious, or at least undesirable, consequences. The necessity of providing adjustments of this kind in battery chargers has, therefore, been undesirable but they have heretofore been considered necessary.

SUMMARY OF THE INVENTION

The present invention provides an automatically-controlled battery charger which can be used without adjustment for charging batteries of different ampere-hour ratings over a wide range, and which automatically adjusts for different numbers of cells in the battery.

In accordance with the invention, a battery charger is provided which includes a controllable voltage source for charging the battery, with control and logic circuits for controlling the charging voltage such that the battery is initially charged at a predetermined maximum charging current until the battery cell voltage reaches a predetermined value. The charging voltage is then controlled to maintain the cell voltage at this value until the charging current has fallen to a predetermined minimum value, and the current is held at this minimum value for a predetermined period of time, such as three hours, after which the charging operation is terminated. The control circuitry includes both digital and analog elements and is arranged to automatically provide all the required control functions. The maximum charging current is maintained at a value corresponding to the highest ampere-hour rating within the range of the charger, and the minimum current is set at a value corresponding to the lowest ampere-hour rating within the range. It has been found that the use of these current values results in satisfactory operation and that batteries over the full range of ampere-hour ratings can be charged with the same maximum and minimum currents and within the required time. The necessity for adjusting the charger for each different ampere-hour rating for which it may be used is thus eliminated and no adjustments for charging current are required. The batteries to be charged may have different numbers of cells, batteries of the type involved frequently having either 48 or 64 cells. Means are, therefore, provided for automatically compensating for the number of cells in the battery, so that no manual or external adjustment is needed and the desired battery voltage per cell is maintained for either number of cells. The control system also includes certain safety features, that is, the battery cannot be reversed but must be connected with proper polarity for charging, and the charger automatically shuts off if the battery should be disconnected during the charge cycle. Power for the control logic circuits is derived from the battery itself so that there is no risk of control power interruption during the charging cycle. It is sometimes desired to continue the charging cycle for an extra period of time in order to equalize the charge between the cells of the battery, and the system includes means for extending the time period at the minimum charging current for this purpose.

BRIEF DESCRIPTION OF THE DRAWINGS

The invention will be more fully understood from the following detailed description, taken in connection with the accompanying drawings, in which.

DESCRIPTION OF THE PREFERRED EMBODIMENT

Figure 1:
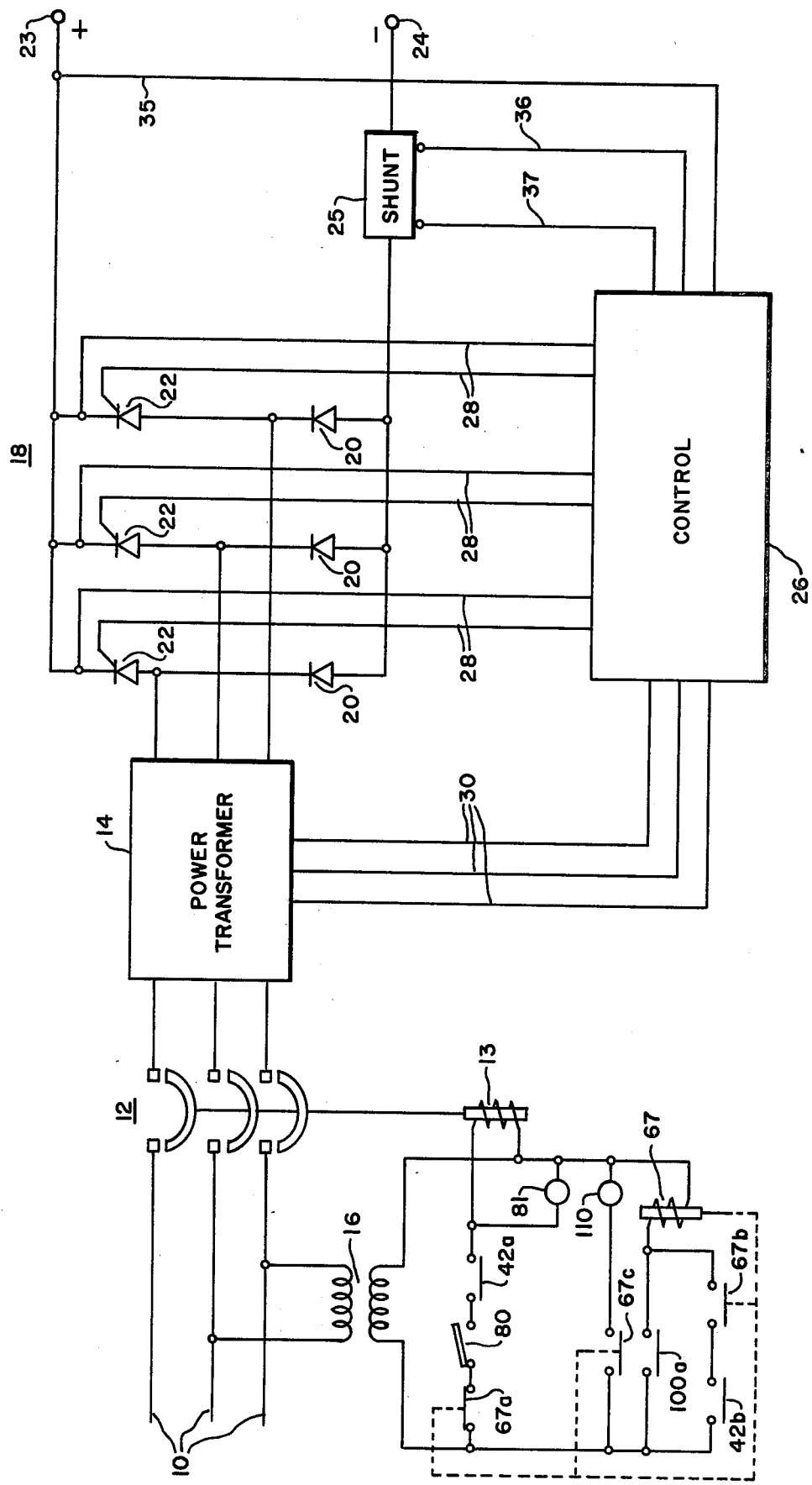
FIG. 1 is a diagram showing the main power circuits of the new battery charger.

The power circuits of the battery charger may be as shown in FIG. 1. As there shown, a power source of any type or voltage, shown as a three-phase line 10, is connected through a main contactor 12 to a power transformer 14. A small single-phase transformer 16 is connected to the line 10 ahead of the contactor 12 to supply a small amount of low voltage power for operation of the contactor 12 under control of certain relays as will be fully described hereinafter. The power transformer 14 is connected to a power rectifier bridge 18 which is preferably a half-controlled bridge; that is, the bridge has power diodes 20 in one side of the bridge and silicon-controlled rectifiers or thyristors 22 in the other side of the bridge. The output voltage of the rectifier bridge 18, therefore, is controllable by controlling the firing angles of the thyristors 22. The output voltage of the bridge is supplied to the terminals 23 and 24 to which a battery to be charged is connected. A shunt 25 is connected in series with the terminal 24 to measure the charging current supplied to the battery.

Figure 2:
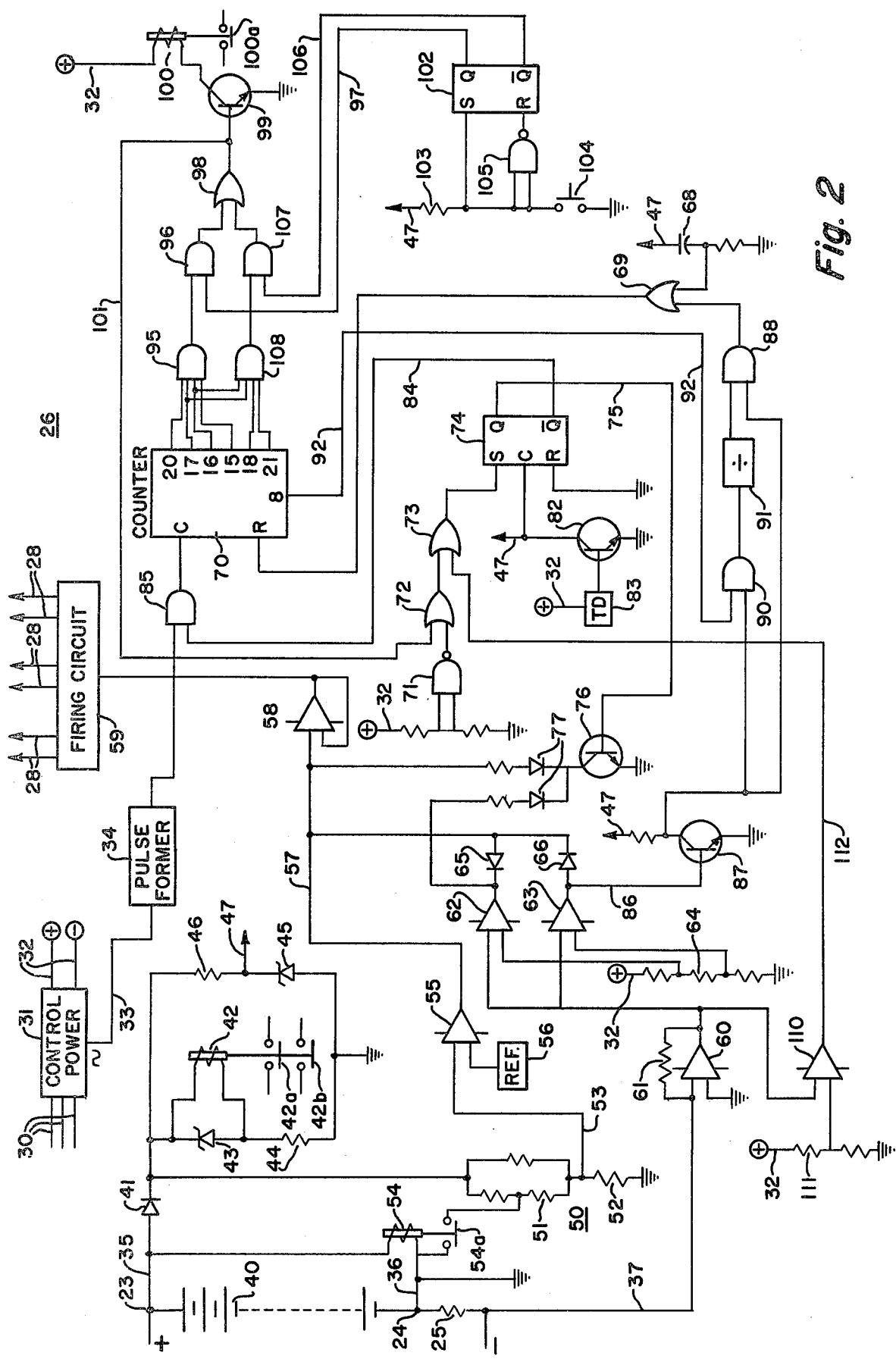
FIG. 2 is a schematic diagram showing the control circuits.

The output voltage of the rectifier 18 is the battery charging voltage and is controllable by controlling the firing angles of the thyristors 22. For this purpose, a control system generally indicated at 26 is provided and supplies firing impulses through three sets of leads 28 to the respective thyristor to fire them at the proper times and in the necessary phase relation to maintain the desired output voltage for application to the battery. Power for the control circuit is supplied from a winding on the power transformer 14 through leads 30 and a transformer 31 (FIG. 2). The control power transformer 31 supplies regulated positive and negative voltages of the desired value, such as 15 volts, for example, on the leads 32. An alternating current output is also provided at 33 and supplied to a pulse former 34 which provides timing or clock pulses to a counter as described hereinafter. The control circuit 26 responds to signal voltages representing the battery charging voltage and charging current. For this purpose, leads 35 and 36 are provided to transmit a battery voltage signal to the control circuit, and leads 36 and 37 similarly provide a signal representing the battery current.

As previously stated, and as shown in FIG. 2, a battery 40 to be charged is connected between terminals 23 and 24. The positive battery terminal 23 is connected by the conductor 35 to a diode 41 which insures that the system will not operate unless the battery is connected with the correct polarity. The battery voltage is connected through the diode 41 to energize a relay 42 which preferably has its coil connected across a Zener diode 43 in series with a resistor 44. The relay 42 has two normally-open contacts 42a and 42b which are connected in the control circuitry for the main contactor 12 as shown in FIG. 1. The battery 40 itself is also used as a voltage source for certain of the control components, and for this purpose a Zener diode 45 and resistor 46 are connected across the battery voltage, providing a regulated output voltage, which may be plus 10 volts, for example, at the lead 47. It will be understood that various amplifiers, logic gates and other control devices are used which require power supplies. In general, the logic devices are supplied from the lead 47, and the regulated voltages available on the leads 32 are used for other power supply purposes in the control system. The individual power supply circuits for each of these devices, however, and the usual feedback circuits for the operational amplifiers, have not been shown, except where necessary, in order to avoid unnecessary complication of the drawing.

The battery voltage appearing on the lead 35 is also applied to a voltage divider 50 consisting of a resistance network 51 in series with a resistor 52. The values of the resistance network 51 and the resistor 52 are chosen to give an output voltage signal on the lead 53 representing the voltage per cell, or the battery voltage divided by the number of cells. Since the battery 40 may have either of two different numbers of cells, a relay 54 is connected across the battery voltage. For the smaller number of cells which may, for example, be 48 cells, the relay contact 54a is open as shown. For the greater number of cells, which may, for example, be 64 cells, the total battery voltage is correspondingly higher and the relay 54 closes its contact 54a. This changes the circuit configuration of the resistance network 51 and changes its resistance value such that the output signal on the lead 53 remains the same as it would be for the smaller number of cells with the relay contact open. The voltage per cell signal on the lead 53 is thus the same for the same cell voltage for either number of cells in the battery.

The voltage signal on the conductor 53 is applied to a differential amplifier 55 where it is compared with a reference voltage indicated at 56. This reference voltage is obtained from a carefully adjusted and temperature compensated network of any suitable type which provides a reference signal to the amplifier 55 corresponding to a desired battery cell voltage, usually the gassing voltage of 2.36 volts at an ambient temperature of 25° C. The differential amplifier 55 thus has as its output on conductor 57 an error signal representing the departure of the actual cell voltage from the value of the reference voltage 56, and this error signal is amplified and its level adjusted by an operational amplifier 58, the output of which is supplied to control the firing circuits 59 for the thyristors 22. The firing circuits 59 may be of any suitable or usual type controlled by the magnitude of the voltage signal received from the amplifier 58 to control the output voltage of the main rectifier 18 as required.

The control signal on conductor 57 is modified during portions of the charging cycle in response to the battery charging current. For this purpose, a battery current signal is obtained from the shunt 25 by means of the lead 57 which applies the current signal to an operational amplifier 60. The gain of the amplifier 60 is set by means of a resistor 61 in its feedback circuit such that when the battery current has the desired maximum value, the output voltage from the amplifier 60 is equal to a preset reference voltage which may, for example, be 1.5 volts. This corresponds to the maximum charging current which may be based on the highest ampere-hour battery capacity for which the charger is to be used. For example, if this ampere-hour rating is 810 ampere-hours, which is a maximum rating for batteries of this type, the maximum charging current would preferably be 160 amperes, and the resistor 61 would be selected such that the output of amplifier 60 is 1.5 volts when the battery current is 160 amperes. It has been found that the same maximum current can be used for batteries of lower ampere-hour rating, within the range of the charger, and the actual magnitude of the maximum current does not affect the battery or the charging operation except that the time at maximum current may be shorter for lower ampere-hour ratings. No adjustment of the maximum current is, therefore, needed for batteries of different ampere-hour ratings.

The output of the amplifier 60 is applied to two operational amplifiers 62 and 63. Reference voltages for these amplifiers are provided by a voltage divider 64 energized from the transformer 31, as indicated, and having two taps to give the desired reference voltages. The higher reference voltage which, in the illustrative embodiment mentioned above, would be 1.5 volts, is applied to the amplifier 62. The amplifier 62 is connected so that when the signal applied to it is less than the reference voltage, indicating that the battery current is less than the maximum charging current, the output of the amplifier 62 is positive. The output signal of the amplifier 62 is connected through a diode 65 to the conductor 57 to modify the signal applied to the amplifier 58. When the output of the amplifier 62 is positive, however, the diode 65 is back-biased and the signal to the amplifier 58 is not affected. If the charging current exceeds the desired maximum, the output of the amplifier 62 goes negative and current can then flow to modify the signal to the amplifier 58 in a direction to reduce the signal. The firing circuits 59 are thus caused to lower the charging voltage and reduce the charging current. The amplifier 62, therefore, acts to modify the signal applied to the amplifier 58 to maintain the preset maximum charging current.

Initially, when the battery 40 is discharged, the cell voltage is relatively low so that the charging current is high and the current is maintained at the desired maximum in the manner just described. As the battery charges, the cell voltage increases, and the charging current tends to decrease. When the cell voltage reaches the desired level which is preferably the so-called gassing voltage, or 2.36 volts per cell, the battery current can no longer reach the preset maximum and falls below it, so that the output of the amplifier 62 is positive and does not affect the signal to the firing circuits. The amplifier 55 is then the sole source of the signal to the firing circuits and the error signal thus supplied acts in the manner previously described to maintain the cell voltage constant at the desired level. This means that as the battery charges and the cell voltage tends to increase, the charging voltage applied to the battery must be reduced, with a corresponding reduction in the charging current, in order to keep the cell voltage constant.

As the battery charges, the battery current thus decreases, and after some period at constant cell voltage, the current will have fallen to the preset minimum level. The minimum level is established by a lower reference voltage which is applied to the amplifier 63 from the voltage divider 64. The low or mininum reference may, for example, be 0.164 volt in the illustrative embodiment, which corresponds to a charging current of approximately 17 amperes which is the minimum charging current for the lowest ampere-hour battery rating within the range of the charger. This current has been found to be adequate for any battery within the range and if maintained for the proper period results in completely charging the battery within the total time required. The amplifier 63 is connected oppositely to the amplifier 62 so that when the charging current is greater than the minimum and the signal to the amplifier 63 exceeds the reference voltage, the output of amplifier 63 is negative. The amplifier 63 is connected through a diode 66 to conductor 57 and when the amplifier output is negative, the diode 66 is back-biased so that there is no effect on the signal to the firing circuits. When the charging current falls below the desired minimum, however, the output of amplifier 63 goes positive and a signal is supplied through the diode 66 to modify the signal to the amplifier 58 to cause the charging voltage to increase sufficiently to bring the current up to the preset minimum.

In the operation of this system, the battery 40 to be charged is connected to the terminals 23 and 24. The battery voltage itself is used to supply certain of the logic components and to control the main contactor. If the battery is connected with the correct polarity, therfore, as determined by the diode 41, the battery voltage causes the relay 42 to be energized and close its contacts 42a and 42b. The contact 42a, as shown in FIG. 1, is connected in series with the operating coil 13 of the main contactor 12 while the contact 42b is connected in the circuit of another relay 67. The battery voltage appearing on the lead 47 is applied to a capacitor 68 to produce a current pulse through an OR gate 69 to reset a counter 70 which will be more fully described hereinafter. At the same time, since the control voltage on leads 30 is still zero, a current or high output (binary 1) occurs from an inverter 71 and is applied through OR gates 72 and 73 to set a flip-flop 74. The Q output of this flip-flop on lead 75 is, therefore, high while the $\bar{Q}$ output is low (binary 0). A transistor 76 is turned ON by the high signal on lead 75 and connects the output signal of amplifier 62 and the signal on conductor 57 to ground through diodes 77, so that these signals are clamped to zero and operation of the charger is prevented.

The control system is now in condition to initiate the charging operation which is done by means of the switch 80 (FIG. 1). This is shown as a manual switch, for simplicity, but might be a timer or other desired device to control closing of the main contactor 12 in any desired manner. The switch 80 and relay contact 42a are in series with a normally-closed contact 67a of the relay 67. When the switch 80 and contact 42a are both closed, therefore, the contactor coil 13 is energized and the main contactor 12 closes to apply power to the rectifier bridge 18 through the power transformer 14. A signal lamp 81 is also turned ON to indicate that the battery is charging. Control power is also made available at the same time through the control power transformer 31 as previously explained. When the control power supply is energized, a transistor 82 is turned ON through a time delay circuit indicated at 83. This results in a clock pulse to the flip-flop 74 causing it to switch states so that the output from the Q terminal becomes low and the transistor 76 is turned OFF. The outputs of the amplifiers 62 and 55 are then no longer clamped and the charging operation can start. At the same time, the output of the $\bar{Q}$ terminal of the flip-flop 74 goes high and an enabling signal is applied on conductor 84 to an AND gate 85 to allow clock pulses to flow from the pulse former 34 to the counter 70.

Closing of the main contactor 12 causes charging current to flow to the battery 40 under the control of the signals derived from amplifiers 55, 62 and 63 and applied to the firing circuits 59. The system will function in the manner described above to maintain the preset maximum charging current until the cell voltage of the battery rises to the preset level, and will then maintain the cell voltage at this level by reducing the current until the preset minimum current is reached, after which the amplifier 63 functions as previously described to maintain the battery current at this minimum level.

The output of the amplifier 63 is applied through a conductor 86 to the base of a transistor 87, the collector of which is supplied with battery voltage from the lead 47. As long as the battery current is above the preset minimum, the output of amplifier 63 is negative and transistor 87 is OFF so that the collector voltage is high and a high (binary 1) signal is applied to an AND gate 88. The high signal from the collector of transistor 87 is also applied to an AND gate 90 and through this gate to a Divide circuit 91 which preferably divides by four; that is, the circuit 91 provides an output pulse for every four input pulses which react it through gate 90. As more fully explained hereinafter, the gate 90 is also supplied with pulses from the counter 70, through conductor 92, at regular intervals which may be of the order of several seconds. As long as the output of the amplifier 63 is negative, therefore, indicating that the battery current is above the minimum, a high signal is continuously applied to the AND gate 90 and a pulse is applied to the gate 90 from the counter 70 at regular intervals. This results in a pulse or high output signal from circuit 91 and the output of AND gate 88 goes high. This signal is transmitted through the OR gate 69 to reset the counter 70. The counter is thus reset to zero and supplies no more pulses on conductor 92 so that it has no effect as long as the output of amplifier 63 remains negative.

When the charging current reaches or falls below the minimum value, so that the output of the amplifier 63 goes positive, the transistor 87 is turned ON and the voltage of its collector becomes substantially zero. The output signal from the transistor to the AND gates 88 and 90, therefore, becomes low (binary 0). No output signals can then be transmitted from the AND gates 88 and 90, so that there is a low signal to the counter and it is not reset. As soon as the output of amplifier 63 goes positive, therefore, the counter 70 is enabled and it counts continuously from that time to establish a desired time period. If the charging current momentarily increases above the minimum, due to a surge or other cause, so that the output of amplifier 63 goes negative, the counter 70 will not be reset unless the current remains above the minimum for a longer time than the interval between pulses from the circuit 91. Momentary fluctuations in current, therefore, do not affect the counter.

The counter 70 may be of any desired type that will count the input clock pulses, but it is preferably of the so-called ripple type consisting of a series of flip-flops, each of which is switched from one state to the other by the output pulses of the preceding flip-flop. Such counters are well known, and for the purpose of the present invention a 21-stage counter is preferably used for counting clock pulses applied to it at a frequency of 60 hertz. Each stage of such a counter has an output alternating between high and low (between 1 and 0) and the outputs of certain desired stages are connected to output terminals. Thus, the output of stage 8 is connected to the conductor 92 to transmit signals to the AND gate 90 when the output of stage 8 is high. With 60 hertz clock pulses this results in an output from circuit 91 in 8.5 seconds, so that the counter is reset to zero as long as the charging current remains above the minimum, as described above. When the current falls to or below the minimum, the gates 88 and 90 have no output signals and the counter is not reset and begins to count.

The counter 70 is used to time the duration of the minimum charging current and to cause the charging cycle to be terminated at the end of the predetermined time. In the preferred embodiment of the invention, this time is normally three hours and with a 21-stage counter, stages 15, 16, 17 and 20 all have high outputs simultaneously at the end of approximately three hours from the initial count, with 60 hertz clock pulses. The outputs of these four stages, therefore, are connected as shown to an AND gate 95, the output of which is applied to another AND gate 96. As will be described below, the AND gate 96 is normally enabled by a high signal through conductor 97 and it output is applied through an OR gate 98 to the base of a transistor 99. When the transistor 99 is turned ON by a signal applied to its base, a relay 100 is energized from the control power supply and closes its contact 100a. At the same time, a signal is applied through conductor 101 and OR gates 72 and 73 to set the flip-flop 74, so that the outputs of amplifiers 55 and 62 are clamped to ground, as previously described, and the enabling signal to AND gate 85 goes low so that the transmission of clock pulses to the counter 70 is discontinued. Operation of the charger is thus terminated.

Referring to FIG. 1, closing of the relay contact 100a completes a circuit to energize relay 67 from the transformer 16. This causes relay contact 67a to open, and normally-open contact 67b closes sealing the relay 67 in, as contact 42b is already closed. Opening of the contact 67a deenergizes the coil 13 and the main contactor 12 opens to deenergize the system and terminate the charging operation. The signal lamp 81 is also turned OFF and a relay contact 67c closes to turn ON a signal lamp 110 to indicate that the battery charge is complete. The battery 40 can then be removed at any time. When the battery is disconnected, the battery voltage supplied to the system is interrupted and the relay 42 is deenergized. The relay contacts 42a and 42b open, allowing relay 67 to drop out, opening its contacts and returning the entire system to its original deenergized condition.

It has been previously mentioned that it is sometimes desired to continue the minimum charging current for a longer time in order to equalize the charge between the different cells in the battery. For this purpose, a flip-flop 102 is controlled from the battery voltage through a resistor 103 and a manual pushbutton 104. The pushbutton 104 is normally open, as shown, and the flip-flop 102 is set from the battery voltage while the reset terminal has a low or zero signal applied through the inverter 105. The Q terminal of flip-flop 102, therefore, has a high output signal which is applied through conductor 97 to enable the gate 96 as described above. The $\overline{Q}$ terminal of flip-flop 102 is low at this time and is connected through conductor 106 to another AND gate 107.

When it is desired to continue the minimum charging current for a longer than normal period to equalize the charge, the pushbutton 104 may be manually closed at any time during the charging cycle. When this is done, the flip-flop 102 is switched to the opposite state so that the signal or output of the Q terminal is low and the output at the $\overline{Q}$ terminal is high. The signal to the AND gate 96 is, therefore, discontinued while an enabling signal is applied to the AND gate 107. With a 21-stage counter and 60 hertz clock pulses as described above, the stages 16, 17, 18 and 21 of the counter 70 will all have high outputs simultaneously at the expiration of approximately six hours from the initial count. The outputs of these four stages, therefore, are connected to an AND gate 108 and the output of gate 108 is connected to the gate 107. If the gate 107 has been enabled by a signal resulting from operation of pushbutton 104, as previously described, an output signal is transmitted through the OR gate 98 to transistor 99, resulting in termination of the charging operation in the manner previously described. The charging period is thus extended to a longer time at the minimum current by operation of the pushbutton 104.

If the battery 40 should be disconnected from the charger, either inadvertently or intentionally, before the charge is completed, the resultant drop in charging current is detected by a differential amplifier 110 connected to the output of the current amplifier 60. The amplifier 110 compares the output of amplifier 60 to a low reference voltage obtained from a voltage divider 111 and produces an output when the current falls to zero or to a very low value, indicating that the battery has been disconnected or that some other failure has occurred. The output signal thus produced from the amplifier 110 is transmitted by conductor 112 and OR gate 73 to set the flip-flop 74, so that the transistor 76 acts to shut down the operation of the charger in the manner previously described. Absence of battery voltage, or extremely low voltage, also results in deenergizing the relay 42 so that it opens its contacts and causes the main contactor 12 to open. The charger is thus shut down and can only be restarted by reconnecting the battery with the proper polarity after which operation can be restarted in the manner previously described.

It will now be apparent that an automatically-controlled battery charger has been provided which can be used to charge batteries of any ampere-hour capacity over a wide range, and having different numbers of cells, without requiring any adjustment or change in the battery charger itself. The charger includes the necessary control circuits to cause it to follow a predetermined charging cycle such that the battery is fully charged within the required time regardless of its ampere-hour rating, and a highly effective charger is thus provided which cannot be misused by making erroneous adjustments.

I claim as my invention:

1. A battery charging system for charging storage batteries of any ampere-hour rating without adjustment, said system comprising a power source for applying a charging voltage to a battery to be charged, first means responsive to battery charging current for initially controlling said charging voltage to maintain a predetermined maximum charging current until the battery cell voltage has reached a predetermined value, means responsive to battery voltage per cell for thereafter controlling said charging voltage to maintain the battery cell voltage at said predetermined value until the charging current falls to a predetermined minimum value, second means responsive to the charging current for controlling the charging voltage to maintain said minimum charging current, timer means for terminating the charging operation after the minimum charging current has been maintained for a predetermined time, and means actuable in response to a rise in battery current above said minimum current value for resetting said timer means whereby the minimum charging current will be maintained for said predetermined time after charging current again falls to said predetermined minimum value.

2. A battery charging system for charging storage batteries of any ampere-hour rating without adjustment, said system comprising a power source for applying a controllable charging voltage to a battery to be charged, first means responsive to battery charging current for initially controlling said charging voltage to maintain a predetermined maximum charging current until the battery cell voltage has reached a predetermined value, means responsive to the battery cell voltage for thereafter controlling said charging voltage to maintain the battery cell voltage at said predetermined value until the charging current falls to a predetermined minimum value which is independent of the ampere-hour rating of the battery, second means responsive to the charging current for controlling the charging voltage to maintain said minimum charging current, and means for terminating the charging operation after the minimum charging current has been maintained for a predetermined time, said means for terminating including a digital counter, means for continuously supplying clock pulses to said counter, means controlled by said second means responsive to charging current for permitting the counter to run continuously as long as the battery current does not exceed said minimum current for more than a predetermined time, said counter providing an output signal after a predetermined period of continuous running, and means responsive to said output signal for effecting termination of the charging operation.

3. The battery charging system of claim 2 including means for resetting said counter when battery current exceeds said minimum current.

* * * * *